3,170,321
FATIGUE TESTING MACHINE

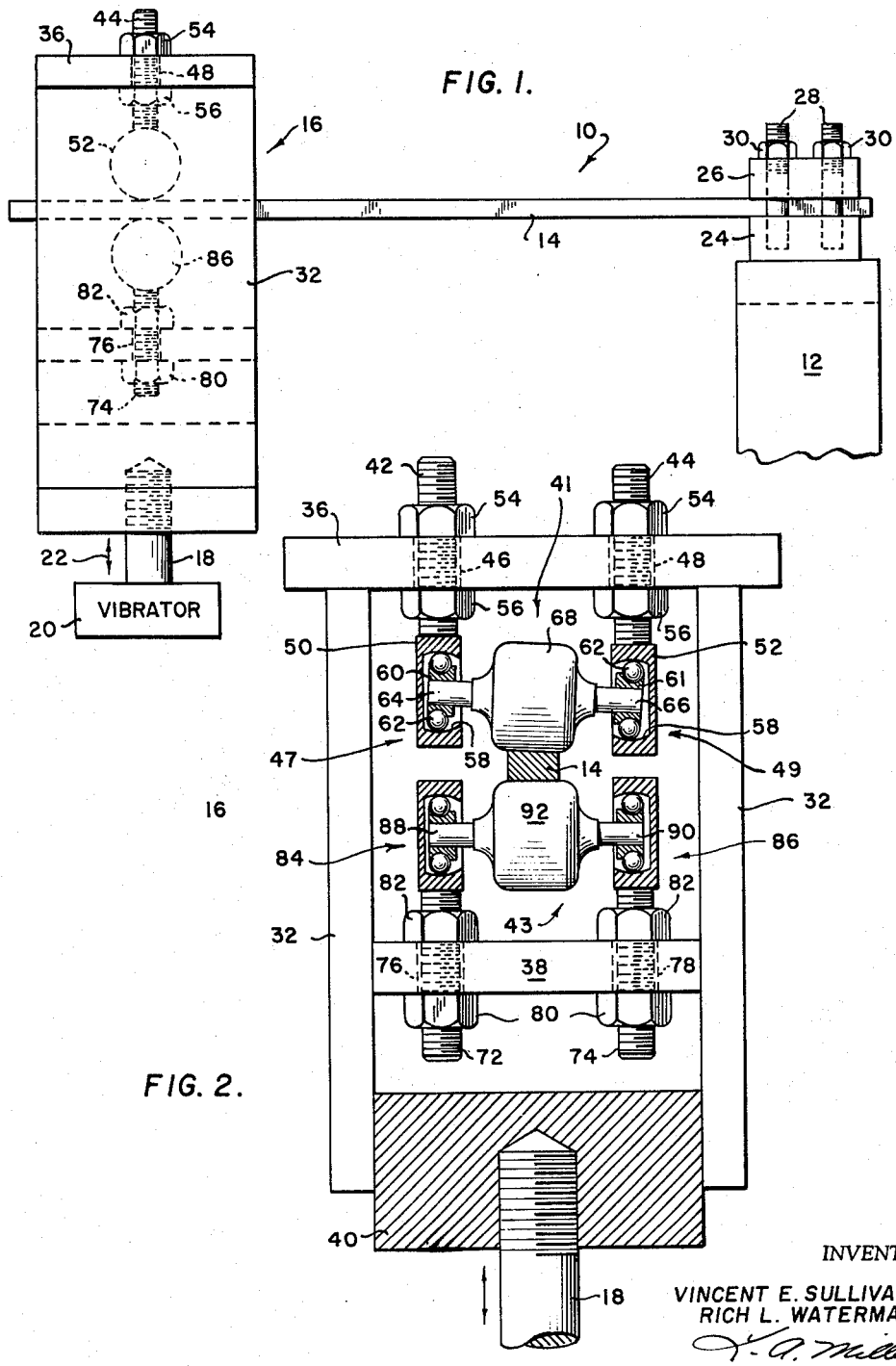

Vincent E. Sullivan, Washington, D.C., and Rich L. Waterman, Rockville, Md., assignors to the United States of America as represented by the Secretary of the Navy
Filed Jan. 5, 1960, Ser. No. 674
8 Claims. (Cl. 73—100)
(Granted under Title 35, U.S. Code (1952), sec. 266)

The invention described herein may be manufactured and used by or for the Government of the United States of America for governmental purposes without the payment of any royalties thereon or therefor.

This invention relates to testing equipment for use in bending tests, and more particularly to a device for assuring pure bending only of a test specimen in a structural fatigue testing machine.

The instant invention is directed primarily to means for subjecting a test specimen to cyclic bending stresses. In accordance with prior art practice, one end of a test specimen is held very rigidly with respect to the testing equipment, while the other or vibratory end of the test specimen is held relatively fixed in a vibratory clamp of the equipment that flexes the specimen through a reciprocating force that the clamp applies to that end. Such equipment introduces forces other than pure bending forces; and test results may be erratic or unreliable. These undesirable forces may come about in several ways. For example, a fixedly attached vibrating clamp does not allow opposite fibers of the test specimen to expand and contract as the specimen is bent, which of course sets up undesirable stresses in the specimen. As a further example, the energy required for flexure accumulates in the specimen in the form of heat, and where that heat cannot be dissipated at a rate such as to maintain the specimen at a constant temperature, the specimen tends to elongate. Such elongation is restricted due to the fact that the vibrating clamp is fixedly clamped to the specimen, thereby causing undesired stresses in the specimen. It is also emphasized that specimens frequently have uneven surfaces or non-parallel surfaces, and also that there may be cases where there is misalignment of the fixed specimen supports, either of which conditions results in the setting up of indeterminable torsional stresses in the specimen if the vibrating clamp is fixedly clamped to the specimen.

It is accordingly an object of this invention to provide a vibratory clamping device for fatigue testing machines that is adapted to overcome the aforementioned disadvantages of the prior art.

Another object of this invention is to provide a testing equipment for applying pure bending to a test specimen undergoing a bending fatigue test.

A further object of this invention is to provide a specimen clamp, for use in conjunction with a structural bending-type fatigue testing machine, which clamp does not set up local compression or tension stresses at the point of attachment of the clamp to the specimen during bending of the specimen.

Still another object of this invention is to provide a clamp for use in conjunction with a structural bending-type fatigue testing machine that will apply cyclic bending to the member and at the same time allow expansion of the member relative to the clamp due to the heat generated in the specimen during bending.

Still an added object of this invention is to provide a structural bending type fatigue testing machine having a clamp so formed that it will not place torsional stresses on a test specimen.

Other objects and many of the attendant advantages of this invention will be readily appreciated as the same becomes better understood by reference to the following detailed description when considered in connection with the accompanying drawings wherein:

FIG. 1 is an elevational view of the instant clamping device as utilized in conjunction with a fatigue testing machine; and FIG. 2 is a side elevational view, taken from the left hand side of FIG. 1, showing the instant invention, partially in section.

Referring now to the drawings wherein like reference characters designate like or corresponding parts throughout the several views, there is shown in FIG. 1 a fatigue testing machine 10 that embodies the invention.

The fatigue tester 10, includes a fixed support 12 to which one end of a test specimen 14 is fixedly clamped. A clamp 16 receives the opposite or vibratory end of the specimen 14. The clamp 16 may, by way of example, be fixedly connected to one end of a rod 18 connected to a mechanical vibrator 20, which may take any one of several known forms. In accordance with conventional practice, the rod 18 is subjected to reciprocating motion in the direction shown by the double arrow 22 by the aforementioned vibrator 20.

The fixed support 12 has at its upper end a fixed plate 24 relative to which a movable plate 26 is connected by a plurality of threaded studs 28 fixedly mounted at one end thereof in the plate 24 and adjustably connected to the plate 26. One end of the test specimen 14 is clamped between the plates 24 and 26 and held in fixed position by tightening a plurality of nuts 30 threadedly mounted on the respective studs 28. Preferably, a pair of studs are provided along each side of the fixed end of the specimen.

The specimen clamp 16, formed in accordance with this invention, comprises a rigid frame comprising a pair of spaced parallel side plates 32 a top plate 36, and a bottom plate 38. For purposes of attaching the clamp 16 to the oscillatory rod 18, the clamp 16 is provided with mounting block 40 to which the rod 18 is fixedly connected by means of a threaded end portion on the upper end of said rod; said threaded portion being mounted in a threaded hole formed in the block 40.

The actual specimen clamping structure, per se, includes a pair of gripping assemblies 41 and 43. The upper assembly 41 includes a pair of threaded studs 42 and 44 adjustably extending through a pair of oversize holes 46 and 48 respectively, formed in the top plate 36. Each of the threaded studs 42 and 44 has fixedly attached to its lower end what constitutes a ball bearing assembly 47 and 49 respectively. The bearings 47 and 49 are substantially alike and each includes an outer ball bearing race 50 and 52 respectively, each of said races being circular in form as can readily be seen in FIG. 1. Each of the studs 42 and 44 is further provided with an upper nut 54 and a lower nut 56 which nuts are threadedly mounted on the studs, and are selectively movable toward one another. The nuts 54 and 56, in the case of each stud, are mounted on opposite sides of the top plate 36 and are movable to such a position as to clamp the plate 36 therebetween, so as to render each of the studs 42 and 44 fixed relative to the clamp 16.

Each of the outer bearing races 50 and 52 is provided with an inner bearing surface 58. Each of the bearing surfaces 58 constitutes a portion of the surface of a sphere. In addition, each of the outer bearing races 50 and 52 provided with an inner bearing race 60 and 61 respectively, having a peripheral ball bearing groove extending around the circumference thereof. The ball bearing groove is equal in radius to the radius of a plurality of balls 62 seated in the groove formed in the inner race 6

At this point, it is emphasized that the radius of t bearing surface 58 in the outer races 50 and 52 is greater than the radius of the outer bearing groove in the inner race 60, so that the inner race and the balls mounted thereon are adapted to pivot laterally of each of the outer races 50 and 52 so as to render the resultant ball bearing assemblies self-aligning, for purposes hereinafter described.

Each of the inner races 60 has mounted therein the end portion of each of a pair of shafts 64 and 66 extending outwardly from the side portion of a roller 68. Thus the roller 68 is rotatably mounted relative to each of the outer bearing races 50 and 52 and relative to the clamp structure 16 as a whole. By virtue of the self-aligning nature of the ball bearings 47 and 49, the respective shafts 64 and 66 need not necessarily be in a horizontal plane but rather they may be tilted out of horizontal position in the manner shown in FIG. 2. This latter feature is of course achieved by moving one of the studs 42 or 44 to a lower position than the other in the clamp frame as shown in connection with the stud 44 in FIG. 2.

Referring now to the lower specimen gripping assembly 43 it is pointed out that the assembly 43 is substantially identical to the upper gripping assembly 41. The assembly 43 comprises a pair of vertically adjustable threaded studs 72 and 74, substantially like the studs 42 and 44, and adjustably mounted within oversized holes 76 and 78 formed in the intermediate plate 38. The studs 72 and 74 each have mounted thereon a pair of spaced lower and upper nuts 80 and 82 respectively, which are mounted on opposite sides of the plate 38, thus rendering each of the studs 72 and 74 adjustable relative to the plate 38 and stable relative thereto by clamping said plate 38 between the nuts 80 and 82 on each of the studs.

Each of the studs 72 and 74 is provided at its upper end with a ball bearing assembly 84 and 86 respectively, the outer race of which is fixedly mounted on the upper end of the respective studs. Both of said ball bearings 84 and 86 are substantially identical to the ball bearings 47 and 49 utilized at the upper end of the clamping structure and described in detail above. It is emphasized that each of the ball bearings 84 and 86, like each of the ball bearings 47 and 49 is of a self-aligning nature, having an inner race that is laterally tiltable relative to the outer race. The inner race of each of the ball bearings 84 and 86 is fixedly mounted on each of a pair of shafts 88 and 90 extending outwardly of the sides of a bottom roller 92 adapted to come in contact with the lower surface of the test specimen 14.

In utilizing the instant invention, the various studs 42, 44, 72 and 74 are loosened relative to the respective plates 36 and 38 so as to render them adjustable transversely thereof at which time the test specimen 14 is inserted between the rollers 68 and 92. Assuming the specimen 14 to be in a neutral, undeflected position, the respective studs are adjusted relative to the plates 36 and 38 so as to bring the rollers 68 and 92 respectively into full line contact with the upper and lower surfaces respectively of the test specimen 14. At this point, and with the rollers in contact with the upper and lower surfaces of the specimen 14, the upper nuts 54 on the studs 42 and 44 are screwed down to contact the upper surface of the plate 36, after which the lower nuts 56 are screwed upwardly into contact with the undersurface of the plate 36. The upper and lower nuts 54 and 56 are now tightened against the plate 36 thereby rendering the respective studs 42 and 44 and the gripping assembly 41 fixed relative to the frame of the clamp 16. With the lower roller 92 in contact with the undersurface of the test specimen 14, the lower and upper nuts 80 and 82 are tightened against the plate 38 in the same manner as described above regarding the nuts 54 and 56, thereby rendering the lower studs 72 and 74 and the gripping assembly 43 fixed relative to the frame of the clamp. At this point both rollers 68 and 92 are in full line contact with the upper and lower surfaces respectively of the test specimen 14.

It is emphasized that in the event that the upper surface, for example, of the test specimen 14 is uneven or not parallel to the lower surface thereof, the upper roller 68 and associated structure will take the form shown in FIG. 2 of the drawing. The rotational axis of the roller 68 in FIG. 2 is tilted at an angle to the horizontal so that the roller 68 establishes line contact with substantially the entire upper surface of the test specimen 14, rather than just a side edge thereof, as would be the case if the studs 42 and 44 were not adjustable relative to one another. This adjustability is made possible first by the fact that the studs 42 and 44 are adjustable relative to one another, and secondly by the fact that the bearing assemblies 47 and 49 are of the self-aligning type.

It is pointed out that in the event that the situation were reverse from that cited above, namely that the lower surface of the test specimen 14 were not horizontal, an adjustment can be made in the studs 72 and 74 similar to the above described adjustment of the studs 42 and 44 and the elements associated therewith, so as to cause the roller 92 to establish line contact with substantially the entire lower surface of the specimen 14, in much the same manner that the roller 68 has been shown to uniformly contact the upper surface of the test specimen. It is emphasized that the aforementioned structure and the manner in which it operates makes it possible to clamp the test specimen 14 in such a way as to eliminate any possible tendency for the clamp to cause torsional stresses in the test specimen, as would be the case if each of the rollers 68 and 92 were adapted to ride in a perfectly horizontal plane only, as has heretofore been the case in the prior art.

In summation, it is pointed out that the specimen clamp 16 allows rolling action of the clamp relative to the test specimen 14 due to the use of the rollers 68 and 92. Thus the instant clamp 16 allows the specimen 14 to elongate due to heat generated therein during fatigue testing, and is also rendered free of undesirable compressive and/or tension stresses produced on the opposite surfaces thereof due to the bending thereof, as would be the case if the clamping elements 68 and 92 were fixed relative to the test specimen 14.

Obviously many modifications and variations of the present invention are possible in the light of the above teachings. It is therefore to be understood that within the scope of the appended claims the invention may be practiced otherwise than as specifically described.

What is claimed is:

1. In a testing machine having means for fixedly gripping a specimen and means for flexing said specimen, a specimen clamp included in said flexing means, said clamp having a frame and including a pair of spaced specimen gripping rollers for rolling contact with said specimen during flexure thereof, each of said rollers having a central shaft means therefor having protruding axially-aligned shaft-parts at opposite sides of the roller, spaced bearing members attached to the frame of the clamp and rotatably supporting the respective shaft-parts on each roller, the bearing members for at least one of said rollers being adjustable relative to one another in a direction transverse of the axis of rotation of the roller, whereby the axis of rotation of said roller is rendered tiltable so that said roller is adapted to be brought into substantially line contact with the surface of the specimen.

2. In a testing machine having means for fixedly gripping a specimen and means for flexing said specimen, a specimen clamp including in said flexing means, said clamp including a pair of spaced specimen gripping rollers for rolling contact with said specimen during flexure thereof, each of said rollers having central shaft means having protruding axially-aligned shaft-parts at the opposite ends thereof, a self-aligning bearing rotatably supporting each of the shafts on each roller, each of the bearings being laterally shiftable relative to one another, thereby rendering the axis of rotation of each roller tiltable to follow the adjacent surface of the specimen with which it is in contact, whereby each roller is adapted to be brought into line contact with the adjacent surface of the specimen so as to eliminate torsional moments about the longitudinal axis of the specimen.

3. A bending machine for bend testing of a specimen having substantially planar, non-parallel opposite surfaces, comprisng means for flexing said specimen, said means comprising a specimen clamp for an end of said specimen, said clamp having a frame and including a pair of spaced, specimen gripping roller means for respectively maintaining rolling contact with said opposite surfaces of said specimen during flexure thereof, said roller means comprising a plurality of rollers, each of said rollers having a shaft affixed thereto at the opposite sides thereof, spaced bearing members attached to the frame of the clamp and rotatably supporting the respective shafts on each roller, the bearing members for at least one of said rollers being adjustable relative to one another in a direction transverse of the axis of rotation of the roller, whereby the axis of rotation of said roller is rendered tiltable relative to said specimen so that said roller is adapted to be brought into substantially line contact with the surface of the specimen.

4. In a testing machine having means for fixedly gripping a specimen having substantially planar, non-parallel opposite surfaces, and a means for flexing said specimen, a specimen clamp included in said flexing means, said clamp including a pair of spaced, specimen gripping roller means for maintaining rolling contact with said opposite surfaces of said specimen during flexure thereof, said roller means comprising a plurality of rollers, each of said rollers having a shaft affixed thereto at the opposite ends thereof, a self-aligning bearing rotatably supporting each of the shafts on each roller, each of the bearings connected to a roller being laterally shiftable relative to one another, thereby rendering the axis of rotation of each roller tiltable relative to the adjacent surface of the specimen with which it is in contact, whereby each roller is adapted to be brought into line contact with the adjacent surface of the specimen so as to eliminate torsional moments about the longitudinal axis of the specimen.

5. In a testing machine means for fixedly gripping a specimen having substantially planar, non-parallel opposite surfaces and means for flexing said specimen, a specimen clamp included in said flexing means, said clamp including a pair of spaced specimen gripping roller means for maintaining rolling contact with said specimen during flexure thereof, said roller means comprising a plurality of rollers, each of said rollers having central shaft-means having protruding axially-aligned shaft-parts at the opposite ends thereof, a ball bearing rotatably supporting each of the shaft-parts on each roller, each ball bearing being adjustably mounted on the clamp for selective movement transversely of the axis of rotation of the roller that it supports, each of said ball bearings having an outer race and an inner race, the inner race of each bearing being mounted on a roller shaft-part and also being tiltable relative to the outer race, whereby the axis of rotation of a roller is adapted to be tilted to follow the specimen by shifting one of its supporting bearings relative to the other to move the rotational axes of the respective inner races attached thereto, out of alignment with one another, thereby allowing adjustment of the rollers relative to the opposite surfaces of the specimen so that each roller maintains substantially line contact with the surface with which it is in contact.

6. A testing machine having means for fixedly gripping one end of a specimen and means for flexing sa specimen by application of a force continually norm to the axis of the specimen, a specimen clamp includ in said flexing means, said clamp including a pair spaced adjustable specimen gripping rollers, said rolle having a specimen-receiving space therebetween trar versely of their axes for maintaining essentially frictio less rolling contact with said specimen in said spa during flexure thereof, said rollers having end mea housed in mounting means, said mounting means havii adjusting means for moving the ends of said rollers rel tive to one another in a direction transverse of the a> of rotation of said rollers, thereby allowing frictionle movement of said specimen between said gripping rolle during flexure of the specimen with substantially no axi force transmitted to said specimen.

7. A device for use in bend testing of a specimen cor prising; means for flexing said specimen through applic tion of a force continually normal to the axis of sa specimen, said means comprising a specimen clamp f receiving an end of said specimen, said clamp includin a pair of spaced rollers having a specimen-receiving spa therebetween transversely of their axes for maintainii frictionless rolling contact with said end of said specime in said space during the application of a force normal the axis of said specimen, shaft means rotatably suppo1 ing said rollers, mounting means having adjusting mea for moving the ends of said rollers relative to one anoth in a direction transverse of the axis of rotation of sa rollers, said ends of said shafts being inserted in moui ing means, thereby allowing substantially frictionless rel tive movement of said specimen between said rollers du ing flexure of the specimen without transmitting a1 noticeable axial force to said specimen, and means f reciprocating said clamp.

8. A device for use in bend-testing of a specimen, cor prising means for flexing said specimen normal to the a> of said specimen, said means comprising a specimen clan for receiving an end of said specimen, said clamp inclu ing a pair of spaced rollers having a specimen-receivii space therebetween transversely of their axes for mai taining substantially frictionless rolling contact with sa end of said specimen during flexure thereof, shaft mea for said rollers, means rotatably supporting said sha means, means for making the axis of rotation of both said rollers tiltable relative to one another, thereby allo ing said rollers to transmit a force normal to the a> of said specimen even though the surfaces of the spe< men are not normal to the axis of said specimen a1 means for reciprocating said clamp.

References Cited by the Examiner

UNITED STATES PATENTS

| | | | |
|---|---|---|---|
| 2,192,179 | 3/40 | Clausen | 308—194 |
| 2,357,643 | 9/44 | Floyd | 73—100 |
| 2,591,444 | 4/52 | Lazan | 73—100 |
| 3,031,886 | 5/62 | Larsson et al. | 73—100 |

FOREIGN PATENTS

| | | |
|---|---|---|
| 530,418 | 12/40 | Great Britain. |
| 610,232 | 10/48 | Great Britain. |
| 101,435 | 9/23 | Switzerland. |

RICHARD C. QUEISSER, *Primary Examiner.*

C. A. CUTTING, *Examiner.*